United States Patent
Desai et al.

(10) Patent No.: US 9,665,419 B2
(45) Date of Patent: *May 30, 2017

(54) ENHANCED RESTART OF A CORE DUMPING APPLICATION

(71) Applicant: International Business Machines Corporation, Armonk, NY (US)

(72) Inventors: Anand T. Desai, Austin, TX (US); Andrew Dunshea, Austin, TX (US); Antonio Garcia, Pflugerville, TX (US); Douglas Griffith, Spicewood, TX (US); Anil Kalavakolanu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/347,839

(22) Filed: Nov. 10, 2016

(65) Prior Publication Data

US 2017/0060626 A1    Mar. 2, 2017

Related U.S. Application Data

(63) Continuation of application No. 14/557,815, filed on Dec. 2, 2014.

(51) Int. Cl.
| | | |
|---|---|---|
| *G06F 11/07* | (2006.01) | |
| *G06F 12/08* | (2016.01) | |
| *G06F 9/48* | (2006.01) | |
| *G06F 11/14* | (2006.01) | |
| *G06F 9/54* | (2006.01) | |
| *G06F 12/0804* | (2016.01) | |

(52) U.S. Cl.
CPC .......... *G06F 11/0778* (2013.01); *G06F 9/485* (2013.01); *G06F 9/4818* (2013.01); *G06F 9/541* (2013.01); *G06F 11/073* (2013.01); *G06F 11/0766* (2013.01); *G06F 11/0793* (2013.01); *G06F 11/1407* (2013.01); *G06F 11/1438* (2013.01); *G06F 11/1446* (2013.01); *G06F 11/1471* (2013.01); *G06F 11/1474* (2013.01); *G06F 12/0804* (2013.01)

(58) Field of Classification Search
CPC ............... G06F 11/0793; G06F 11/073; G06F 11/0766; G06F 11/0778; G06F 11/1407; G06F 11/1438; G06F 11/1446; G06F 11/1471; G06F 11/1474; G06F 12/0804; G06F 9/485

See application file for complete search history.

(56) References Cited

U.S. PATENT DOCUMENTS

| | | |
|---|---|---|
| 3,814,919 A | 6/1974 | Repton et al. |
| 4,695,949 A | 9/1987 | Thatte et al. |
| 6,601,188 B1 | 7/2003 | Wilding |

(Continued)

OTHER PUBLICATIONS

IBM: List of IBM Patents or Patent Applications Treated as Related (Appendix P), Dec. 21, 2016, 2 pages.

*Primary Examiner* — Matt Kim
*Assistant Examiner* — Paul Contino
(74) *Attorney, Agent, or Firm* — L. Jeffrey Kelly

(57) ABSTRACT

A method for enhanced restart of a core dumping application is provided. The method includes stopping a plurality of threads in an address space, except for the thread performing the core dump. Computational segments are remapped to client segments. Each open file descriptor in the address space is closed. The application is terminated and the client segments are flushed to external storage.

1 Claim, 5 Drawing Sheets

(56) References Cited

U.S. PATENT DOCUMENTS

| | | |
|---|---|---|
| 6,681,348 B1 | 1/2004 | Vachon |
| 6,779,132 B2 | 8/2004 | Andress et al. |
| 6,792,559 B1 | 9/2004 | Cohen et al. |
| 7,290,175 B1 | 10/2007 | Kessler et al. |
| 7,490,268 B2 | 2/2009 | Keromytis et al. |
| 7,818,616 B2 | 10/2010 | Kathail et al. |
| 8,583,960 B2 | 11/2013 | Settsu |
| 9,164,846 B2 | 10/2015 | Lang et al. |
| 9,218,234 B2 | 12/2015 | Wen |
| 9,436,537 B2 | 9/2016 | Desai et al. |
| 2003/0145157 A1 | 7/2003 | Smullen et al. |
| 2005/0210077 A1 | 9/2005 | Balakrishnan et al. |
| 2008/0270422 A1 | 10/2008 | Craft et al. |
| 2010/0268993 A1 | 10/2010 | Chaudhari et al. |
| 2011/0295821 A1 | 12/2011 | Harris |
| 2013/0111264 A1 | 5/2013 | Settsu |
| 2015/0100825 A1 | 4/2015 | Jibu et al. |
| 2016/0154701 A1 | 6/2016 | Desai et al. |

ENHANCED RESTART OF A CORE DUMPING APPLICATION

BACKGROUND

This disclosure relates generally to computer systems, and more particularly to faster core dump completion, thus allowing faster application restarts.

A core dump includes the program state data and contents of computer memory that a computer program is using at a given point in time. A core dump may be initiated at any time the application program is running, but more typically the core dump occurs when the application program abnormally terminates due to a severe error condition. The program state data includes: computer system control structures, such as page tables; status flags; processor registers; program instruction counter; and stack pointer. While the core dump is being created and written to storage, the application program's resources, such as shared memory segments, and inter-process communication (IPC) sockets, remain in use until the core dump process completes. Therefore, restarting the application program and its processes is delayed for the duration of the core dump process because the new instance of the application program needs the resources currently in use. Especially when the application program consumes large amount of system resources, collecting the core dump data becomes time consuming in view of increasingly strict system availability requirements. An application program may have a customized file format for saving state data for later problem determination. However, to be effective, the file would have to be well designed to capture the appropriate data for any given problem, yet be small enough to enable quicker restart of the application program. Additionally, modifications to the application program would result in re-design of the customized file, leading to costly investment in maintenance resources to be effective. Consequently, system administrators may be encouraged to either prematurely abort core dumps, or to collect only partial core dumps, rather than extend the duration of the application program outage.

SUMMARY

According to one embodiment, a method for enhanced restart of a core dumping application is provided. The method includes: stopping a plurality of threads in an address space; continuing a thread, wherein the thread performs a core dump; remapping a computational segment to a client segment; closing each open file descriptor in the address space; terminating the core dumping application; and flushing the client segment to an external storage.

According to another embodiment, a computer program product for enhanced restart of a core dumping application is provided. The computer program product includes a computer readable storage medium readable by a processing circuit and storing instructions for execution by the processing circuit for performing a method is provided. The method includes: stopping a plurality of threads in an address space; continuing a thread, wherein the thread performs a core dump; remapping a computational segment to a client segment; closing each open file descriptor in the address space; terminating the core dumping application; and flushing the client segment to an external storage.

According to another embodiment, a computer system for enhanced restart of a core dumping application is provided. The computer system includes a memory, a processing unit communicatively coupled to the memory, and a management module communicatively coupled to the memory and processing unit, whereby the management module is configured to perform the steps of a method is provided. The method includes: stopping a plurality of threads in an address space; continuing a thread, wherein the thread performs a core dump; remapping a computational segment to a client segment; closing each open file descriptor in the address space; terminating the core dumping application; and flushing the client segment to an external storage.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure relates generally to the field of computer systems, and more particularly to an enhanced restart of a core dumping application. In current operation, an application may not restart until the core dump completes, since the restarted application requires the resources held by the core dumping application, and pages are copied from the address space to a temporary memory area prior to writing the core dump to the core file. The following described exemplary embodiments provide a system, method and program product to reduce the time required to collect diagnostic information and restart a failed application program. The technical effects and benefits include the ability to reduce the time that an application is unavailable to the business enterprise, and the conservation of memory and computer system resources by eliminating the intermediate copy to temporary memory.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Figure 1:
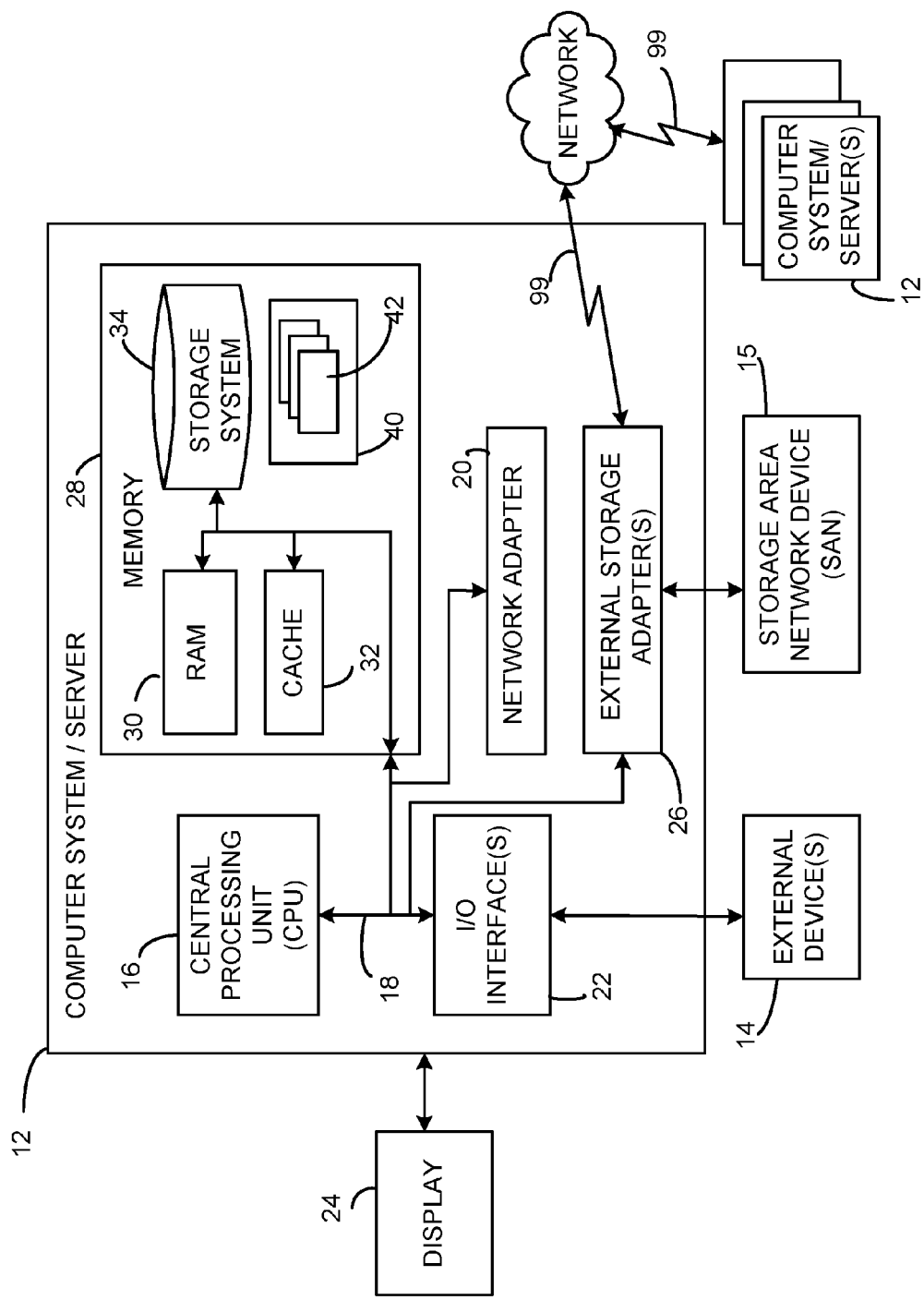
FIG. 1 illustrates an exemplary computing node operable for various embodiments of the disclosure.

Turning now to FIG. 1, a block diagram of an exemplary computer system (server) 12 operable for various embodiments of the disclosure is presented. As shown, the server 12 is only one example of a suitable computer for enhanced restart of a core dumping application, and is not intended to suggest any limitation as to the scope of use or functionality of embodiments of the disclosure described herein.

The server 12 is operational in numerous other computing system environments or configurations. For example, the server 12 may be a standalone machine, a virtual partition on physical host, a clustered server environment, or a distributed cloud computing environment that include any of the above systems or devices, and the like. When practiced in a distributed cloud computing environment, tasks may be performed by both local and remote servers 12 that are linked together and communicate through a communications network, such as the network 99.

The server 12 may be described in the context of executable instructions, such as a program, or more specifically, an operating system (OS) 40 that is an aggregate of program modules 42 being executed by the processing unit 16 to control the operation of the server 12. Program modules 42 perform particular tasks of the OS 40, such as process management; memory management; and device management. The program modules 42 may be implemented as routines, programs, objects, components, logic, or data structures, for example. The program modules 42 performing the particular tasks may be grouped by function, according to the server 12 component that the program modules 42 control. At least a portion of the program modules 42 may be specialized to execute the algorithms of FIG. 4.

In a distributed computing environment, such as a cloud computing environment, each participating server 12 may be under the control of an OS 40 residing on each local and remote server 12, respectively. In a virtual machine, also referred to as a virtual server, each instance of the virtual machine is an emulation of a physical computer. A physical computer may host multiple virtual machine instances, each sharing the hardware resources of the physical computer, and each emulating a physical computer. Each of the virtual machine instances is under the control of an OS 40.

As shown in FIG. 1, the components of the server 12 may include, but are not limited to, one or more processors or processing units 16, a system memory 28, and a bus 18 that couples various system components, such as the system memory 28, to processor 16.

System memory 28 can include computer system readable media in the form of volatile memory, such as random access memory (RAM) 30 and/or cache memory 32. The server 12 may further include other removable/non-removable, volatile/non-volatile computer system storage media.

By way of example only, a storage system 34 can be provided as one or more devices for reading from and writing to a non-removable, non-volatile magnetic media, such as a hard disk drive (HDD) or an optical disk drive such as a CD-ROM, DVD-ROM. Each device of the storage system 34 can be connected to bus 18 by one or more data media interfaces. The program modules 42, the OS 40, and one or more application programs may be stored on the storage system 34 and subsequently loaded into memory 28 for execution, as needed.

The server 12 may also communicate with one or more external devices 14 such as a keyboard, a pointing device, a display 24, etc.; one or more devices that enable a user to interact with the server 12; and/or any devices (e.g., network card, modem, etc.) that enable the server 12 to communicate with one or more other computing devices. Such communication can occur via I/O interfaces 22. Still, the server 12 can communicate with one or more networks such as a local area network (LAN), a general wide area network (WAN), and/or a public network (e.g., the Internet) via a network adapter 20. As depicted, the network adapter 20 communicates with the other components of the server 12 via bus 18. External storage adapter 26 connects the server 12 with external storage subsystems, such as a storage area network (SAN) 15 or RAID array. Exemplary external storage adapters 26 include, but are not limited to, a host bus adapter (HBA), host channel adapter (HCA), SCSI, and iSCSI, depending upon the architectural implementation. The external storage adapter 26 communicates with the processing unit 16 and memory 28 of the server 12 over bus 18.

It should be understood that although not shown, other hardware and/or software components could be used in conjunction with the server 12. Examples include, but are not limited to: microcode, device drivers, redundant processing units, external disk drive arrays, RAID systems, tape drives, and data archival storage systems, etc.

Figure 2:
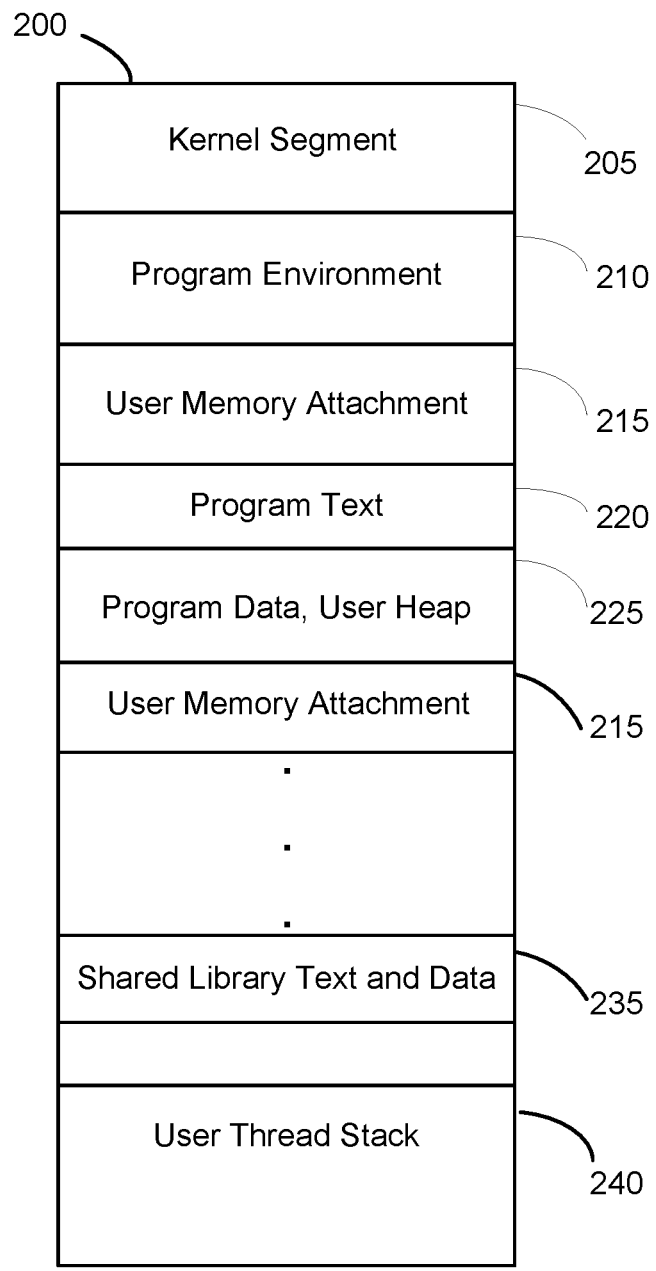
FIG. 2 illustrates computer memory regions of an exemplary address space for a computer process.

Referring now to FIG. 2, computer memory regions (not to scale) of an exemplary process address space 200 are illustrated. In some implementations, the address space of the kernel of the OS 40 (FIG. 1) may differ in content and structure from a process address space. Therefore as used herein, an address space refers the address space of a process. The address space, also referred to as a context, represents the range of addressable locations that are allocated to a process. In a linear, or flat, memory model, the memory allocated to an address space appears to be a contiguous range of addresses. However, in a segmented memory model, an address space 200 is allocated in terms of segments, for example, of 256 megabytes (MB) each. A reference to an address in a segmented address space includes invoking server 12 hardware and OS 40 (both of FIG. 1) components to identify the segment containing the page reference and subsequently translating the virtualized address from the segment to a real address. The segmented memory model allows a process to appear to have full access to all of server 12 physical RAM 30 (both of FIG. 1), and also appear to reference more RAM 30 (FIG. 1) than is physically present. The concept of translating virtualized addresses to real addresses is both well-known in the art and implementation dependent. Therefore, address translation, as such, will not be discussed with reference to the present disclosure, since any implementation may be used. While the present disclosure is described as an exemplary segmented memory implementation, the present disclosure may be implemented in a linear, or other, memory model, according to the architecture of the selected memory model.

A layout of address regions in an address space implementation may be vendor or platform specific. For example, the address space 200 may be similar to a representation of a 64-bit address space in the Linux® or AIX® OS 40 (FIG. 1). However, each may differ from a Windows® address space 200 implementation, for example. Linux is the registered trademark of Linus Torvalds in the United States, other countries, or both. AIX is the registered trademark of International Business Machines Corporation in the United States, other countries, or both. Microsoft, Windows, and the Windows logo are trademarks of Microsoft Corporation in the United States, other countries, or both.

The kernel segment 205 occupies the top of the address space 200. This range of addresses is not available to the process. The program environment 210 segment includes, among other things, the name of the process being executed and arguments that are passed into the process at start of execution. The user memory attachment segments 215 are available for the process to add a shared memory segment to the address space 200. The attached segment may be used to map a file from external storage into process memory, or for communicating between two or more processes, also referred to as inter process communication (IPC). The program text 220 segment includes the executable code that comes from the program running in the address space 200. The program data 225 segment includes both initialized and uninitialized global variables that the process is using. User heap is an area of pre-reserved memory that the process explicitly allocates and frees to store data in some amount that may be unknown until the process is executing. The shared library text and data 235 segment represents the area in the address space 200 into which the OS 40 (FIG. 1) maps a reference to a shared library. However, the shared library may not be physically included in the address space 200. A shared library may contain common functions, such as for printing or mathematical calculations, that are used by several processes. Through other OS 40 (FIG. 1) components, such as the linker and loader, the process may refer to variables and invoke functions that are defined and located in the shared library. Mapping a memory reference to the shared library rather than copying the library into the address space 200 not only saves memory resources, but also ensures that the processes are using a uniformly consistent copy of the library functions. The user thread stack 240 segment includes the return addresses, parameters, and local variables of the function being executed.

In some implementations, the pages that the OS 40 (FIG. 1) identifies as belonging to the kernel segment 205, the program data 225 segment, the shared library text and data 235 segment, and the user thread stack 240 segment may be referred to as containing working storage pages. These are pages that contain volatile data that is not preserved across a reboot, such as by being backed by persistent file system storage. Working storage pages may also be referred to as computational pages. In other implementations, working storage pages may be referred to as anonymous memory. In an embodiment, a client segment that contains client pages may be implemented. Client pages may be referred to as those pages that contain cached data for files being read and written to.

Figure 3:
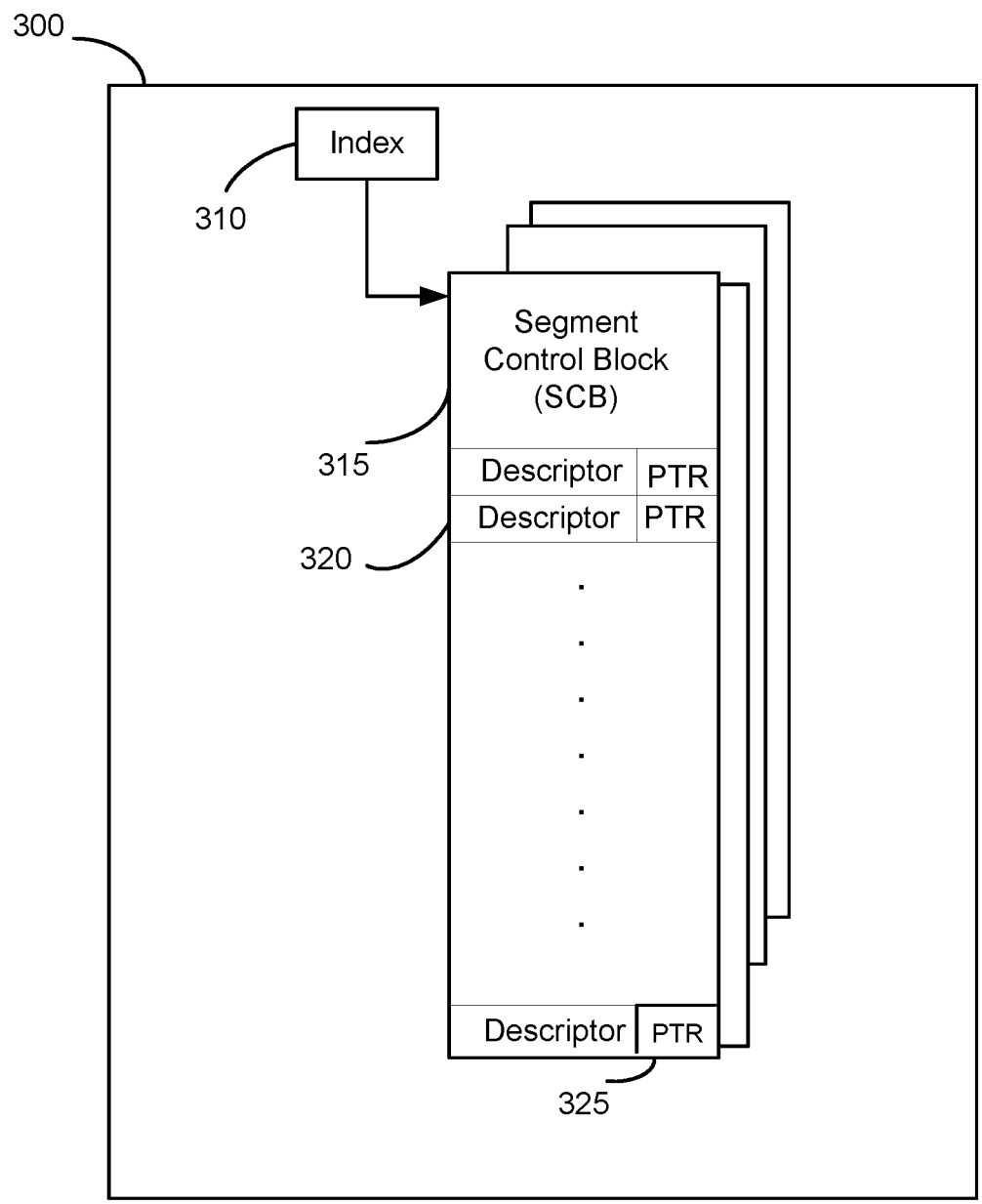
FIG. 3 illustrates a portion of exemplary control structures for managing computer memory regions.

In FIG. 3, 300 illustrates a portion of exemplary control structures that may be implemented for managing computer memory regions in a segmented memory model. As shown in 300, the segment control blocks (SCB) 315 may be arranged in an array that is indexed by an index 310. Each SCB 315 may include: an identification of the type of segment; a count of pages in the segment, for example, allocated pages and pinned pages; and a pointer to the descriptors 320. Each SCB may contain multiple descriptors 320. A descriptor 320 may be a structure for identifying the address and location, for example in memory or on a paging device, of the page being described. A descriptor 320 may additionally include a pointer ptr 325 to a structure that may be used to translate a virtualized address to a real address. In this implementation, each SCB 315 indicates the segment type, such as working storage or client storage. The control structures of FIG. 3 are presented by example, not by limitation, as those skilled in the art may well realize.

Figure 4:
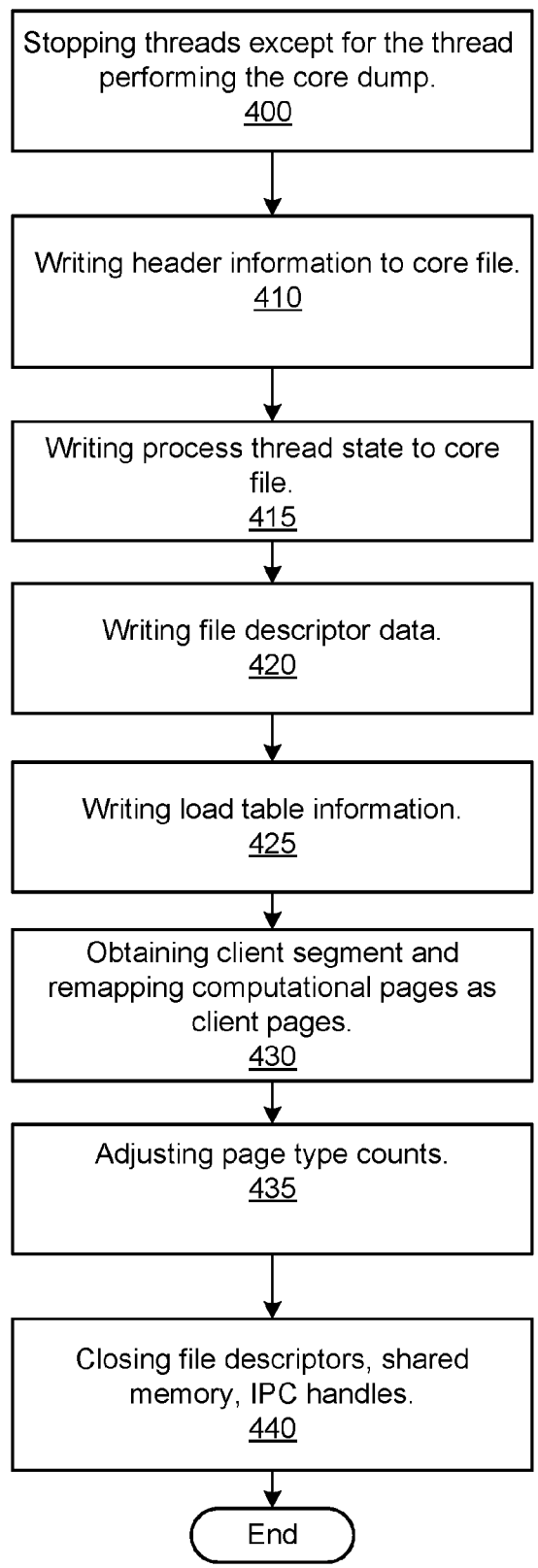
FIG. 4 is an operational flowchart illustrating an algorithm for enhanced restart of a core dumping application, according to various embodiments of the disclosure.

Referring now to FIG. 4, an algorithm for enhanced restart of a core dumping application, according to various embodiments of the disclosure, is illustrated. A core dump may be initiated manually, or as a result of a program abnormally terminating due to a severe error condition. Upon initiation of a core dump, at 400 the OS 40 (FIG. 1) stops threads that are still executing in the address space 200 (FIG. 2), except for the thread that is performing the core dump.

At 410, the OS 40 (FIG. 1) writes header information to the core file for subsequent use by a diagnostic utility in interpreting the format and contents of the file. Among other information, the header may include: an indicator of the file format, such as executable and linkable format (ELF); an indicator of the target instruction set architecture; and at least one pointer to the data sections in the core file.

At 415, the OS 40 (FIG. 1) writes to the core file the state of the process threads. In computing, a process may include one or more threads. A thread may represent an independent stream of program instructions that the OS 40 (FIG. 1) may schedule to run simultaneously and independently of other threads in the process. Being an independent stream of program instructions, a thread may maintain structures that are similar to those of the main process, including: a stack pointer; registers; scheduling properties, such as priority; signals; and thread-specific data.

At 420, the OS 40 (FIG. 1) writes to the core file the descriptor data for each open file in the address space 200 (FIG. 2). A file descriptor represents an index into an array of open files in a process or thread. Operations such as to read, write, open, and close a file use the file descriptor to locate the target of the I/O operation. The file descriptor, according to the vendor-specific implementation, may point to at least one structure that identifies: the file name and location; and the I/O operation and status. A file may include: directories and persistent locations containing data, for example on disk drives; standard input, for example through a keyboard; a pipe, which may be used for IPC between a parent and child process; and a socket, which may be used for IPC across a computer network.

At 425, the OS 40 (FIG. 1) writes the load table information for the process to the core file. As described previously with reference to FIG. 2, a shared library is one that contains functions or procedures that are used by multiple processes, but that is only included in the address space 200 (FIG. 2) by a mapped memory reference. Since an address space 200 (FIG. 2) may include more than one shared library, at 425 the OS 40 (FIG. 1) writes the location where the shared library is mapped in the address space. Addresses are resolved for symbols and functions used by the process but defined in the shared library.

At 430, the OS 40 (FIG. 1) maps computational pages as client pages. As described previously with reference to FIGS. 2 and 3, working storage pages may be referred to as computational pages or non-persistent pages since they are not backed by persistent file system storage, and client pages contain cached data for file I/O. The SCB 315 (FIG. 3) participates with components of the server 12 hardware and the OS 40 (both of FIG. 1) to identify and locate pages associated with the address space (FIG. 2). The OS 40 (FIG. 1) may obtain a client segment to receive the descriptors 320 (FIG. 3) from a working storage segment. Upon locating a segment containing working storage type pages, the OS 40 (FIG. 1) may remap, i.e., copy the descriptors 320 (FIG. 3) from the working storage segment into the client segment. Since a segment may be only partially allocated, only those descriptors 320 (FIG. 3) that correspond to an allocated page are copied. The components of the server 12 hardware and the OS 40 (both of FIG. 1) may cooperate to locate the page, for example through the ptr 325 (FIG. 3) and make the page available for writing to the core file. For example, a page that is paged out may be brought into memory from the external paging device.

At 435, the OS 40 (FIG. 1) adjusts the page type counts. The SCB 315 (FIG. 3) may include a count of how many pages are present in the segment. The page count in the working storage segment is decrement for each descriptor 320 (FIG. 3) that is removed, and the page count in the client segment is incremented for each corresponding descriptor 320 (FIG. 3) that is added to the client segment.

At 440, the open file descriptors and IPC descriptors that are associated with the address space 200 (FIG. 2) may be closed, and shared memory segments that are attached to the address space 200 (FIG. 2) may be released. When the client segment is written to the core file, according to OS 40 (FIG. 1) protocols, the application program may be terminated and restarted.

Figure 5:
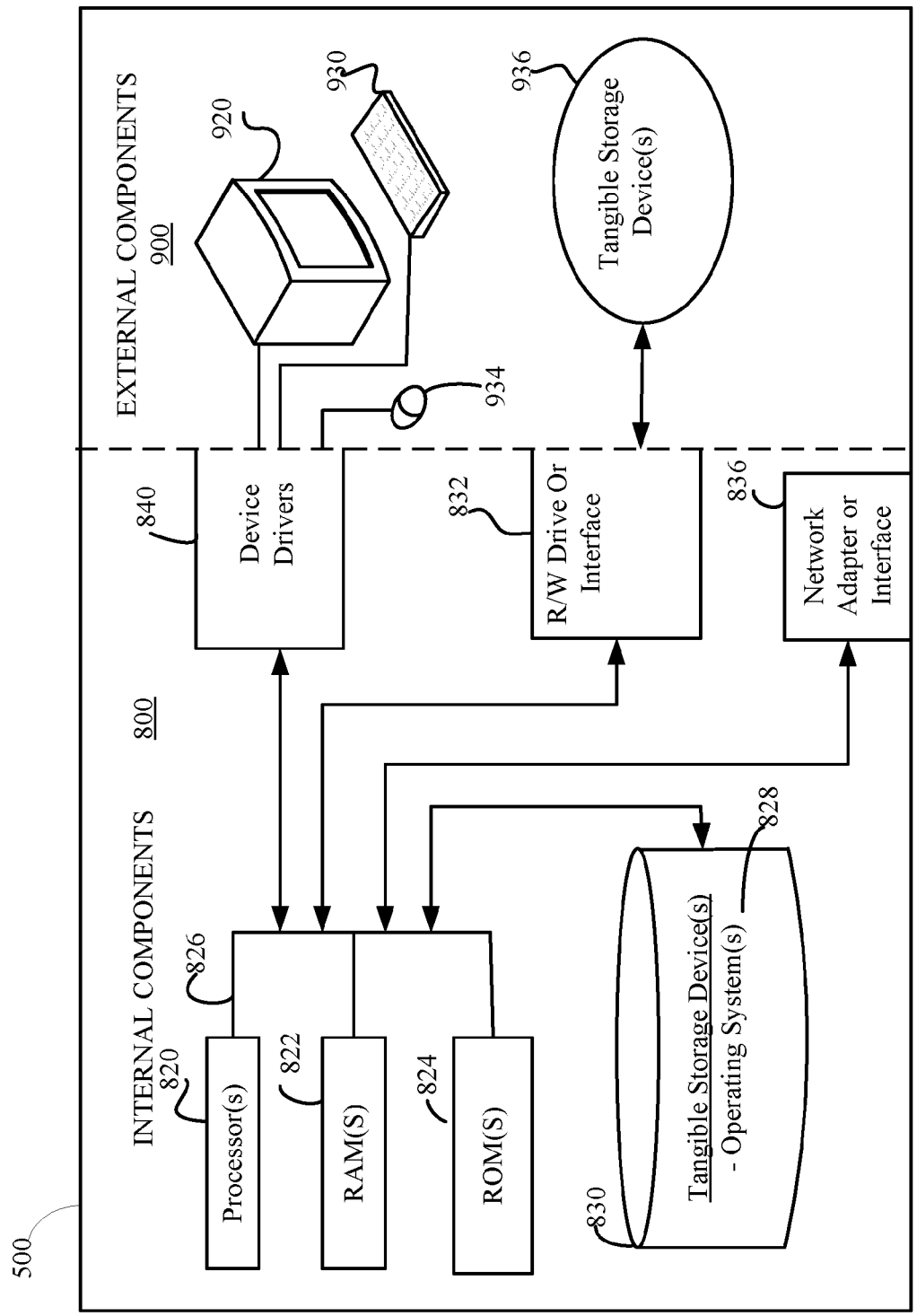
FIG. 5 is a schematic block diagram of hardware and software of the computer environment according to an embodiment of the processes of FIG. 4.

Referring now to FIG. 5, computing device 500 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the method of FIG. 4; and one or more computer-readable tangible storage devices 830. The one or more operating systems 828 (including the additional data collection facility) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 500, can be downloaded to computing device 500 from an external computer (e.g., server) via a network (for example, the Internet, a local area network, or other wide area network) and respective network adapters or interfaces 836. From the network adapters (or switch port adapters) or interfaces 836 and operating system 828 associated with computing device 500 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A computer program product for enhanced restart of a core dumping application comprising a computer readable storage medium readable by a processing circuit and storing instructions for execution by the processing circuit for performing a method comprising:
   a computer readable memory;
   a processing unit communicatively coupled to the computer readable memory;
   a computer readable storage medium; and
   program instructions stored on the computer readable storage medium for execution by the processing unit via the computer readable memory, the program instructions comprising:
   program instructions to stop a plurality of threads in an address space;
   program instructions to continue a thread, wherein the continued thread performs a core dump;
   program instructions to remap a computational segment to a client segment, wherein the remapping comprises:
      program instructions to obtain the client segment, wherein the client segment includes a plurality of client pages, and wherein the client pages comprise cached file data;
      program instructions to copy a plurality of segment descriptors associated with a plurality of computational pages from the computational segment to the client segment;
      program instructions to decrement a first count, wherein the first count corresponds to a number of computational pages identified by the plurality of segment descriptors copied from the computational segment; and program instructions to increment a second count, wherein the second count corresponds to the number of computational pages identified by the plurality of segment descriptors copied to the client segment;

program instructions to close each open file descriptor in the address space;

program instructions to terminate the core dumping application; and program instructions to flush the client segment to an external storage.

* * * * *